Aug. 11, 1970   G. E. CONKLIN ETAL   3,524,127
ADJUSTABLE FILTER NETWORKS UTILIZING
THE EFFECTS OF MAGNETIC RESONANCE
Filed Feb. 7, 1968   3 Sheets-Sheet 1

3,524,127
ADJUSTABLE FILTER NETWORKS UTILIZING THE EFFECTS OF MAGNETIC RESONANCE
Glenn E. Conklin, Katonah, N.Y., and Ivan A. Greenwood, Jr., Stamford, Conn., assignors to Singer-General Precision, Inc., a corporation of Delaware
Filed Feb. 7, 1968, Ser. No. 703,586
Int. Cl. G01n 27/78
U.S. Cl. 324—.5        2 Claims

ABSTRACT OF THE DISCLOSURE

NMR apparatus including a low density sample of $^{199}$Hg vapor utilizes optical pumping and monitoring by 2537 A. ultraviolet resonant radiation obtained from a $^{204}$Hg lamp source. The $H_0$ or static magnetic field is modulated by a source of locally generated frequencies to generate sideband spin-precessional frequency components in satellite positions to the usual Larmor frequency while the $H_1$ or varynig magnetic field serves as the input for a spectral signal to be filtered. When the input signal includes frequency components coincidental with any one of the sideband frequencies, all of the sidebands are excited and all sideband frequencies appear as A.C. modulations in the readout or monitoring beam.

BRIEF DESCRIPTION OF THE INVENTION

The present invention relates generally to devices utilizing magnetic rseonance phenomena and more particularly, nuclear magnetic resonance phenomena, sometimes referred to herein as NMR. A prior-art technique for investigating such phenomena and for conducting NMR experiments is fully described in the patent to Bloch et al. Re. No. 23,950 entitled "Method and Means for Chemical Analysis by Nuclear Inductions."

In particular, the subject invention discloses magnetic resonance techniques for synthesizing a multiplicity of adjustable filter networks, one such network being capable of creating passbands having a wide variety of shapes and bandwidths. Another network capable of being fashioned by the disclosed apparatus is one having a "comb-like" passband. By "comb-like" is meant the shaping of a passband having a plurality of well defined relatively narrow pass or rejection bands equally spaced in the frequency domain. In yet another of its preferred forms, the NMR apparatus according ot the present invention is capable of shaping spectrums having arbitrarily spaced pass and rejection bands or to put it another way "comb-like" passbands having irregularly spaced "teeth."

Relating more specifically to a first preferred embodiment of the invention, a cell containing a nuclear sample in vapor form is placed within a steady magnetic field $H_0$ having its magnetization vector directed along the Z axis of a rectangular coordinate system. The cell is then "optically pumped" by an intense beam of optical frequency radiation passing through the sample in the Z direction. Magnetic coils for creating a smaller varying magnetic field $H_1$ are located relative to the sample cell so that the $H_1$ magnetization vector oscillates along the cell's X axis. A second beam of light radiation is then passed through the cell in the latter's X-Y plane for monitoring the magnetic resonance effcets of the nuclear sample. Means are provided for modulating the steady magnetic field $H_0$ with a stable audio frequency and the spectral signal to be filtered is fed into the coils used to generate the $H_1$ field. Modulation of the $H_0$ field tends to produce sideband resonances in satellite positions to the usual central magnetic resonance. If the $H_1$ input or drive signal has a frequency component coincident with any one of the resonant sidebands all of the sidebands will be excited and therefore all of the sideband frequencies will be observed as modulations on the monitoring or readout beam. When a large index of modulation is chosen several significant orders of sidebands are produced in the readout circuit thus forming a "comb-like" passband.

In an alternate preferred form of the invention a relatively small index of modulation is chosen and the $H_0$ field is modulated with a set of closely spaced frequencies so that only the first order sidebands corresponding to each modulation frequency are generated. Hence, only those frequency components in the $H_1$ input signal coincident with each of the sidebands will be observed in the readout circuit. Arbitrary passbands may thus be formed by merely selecting appropriate modulating frequencies close enough together in the frequency domain such that their common effects define a total passband shape.

In still another preferred form of the invention a pair of nuclear magnetic resonance cells are coupled together in a feedback type arrangement. Each cell is weakly modulated by a differnet set of frequencies for generating corresponding first order sidebands in their respective output circuits. One cell will pass frequencies corresponding to its intrinsically generated sidebands and the other cell will reject frequencies corresponding to its intrinsically generated sideband structure. The total effect of the circuit is to produce a "comb-like" passband having irregularly spaced "teeth," depending upon the particular modulation frequencies selected.

These and other objects and advantages will be apparent from a study of the following detailed description of the preferred forms of the invention, read in connection with the accompanying drawings.

DRAWINGS

DETAILED DESCRIPTION OF THE INVENTION

Figure 2:
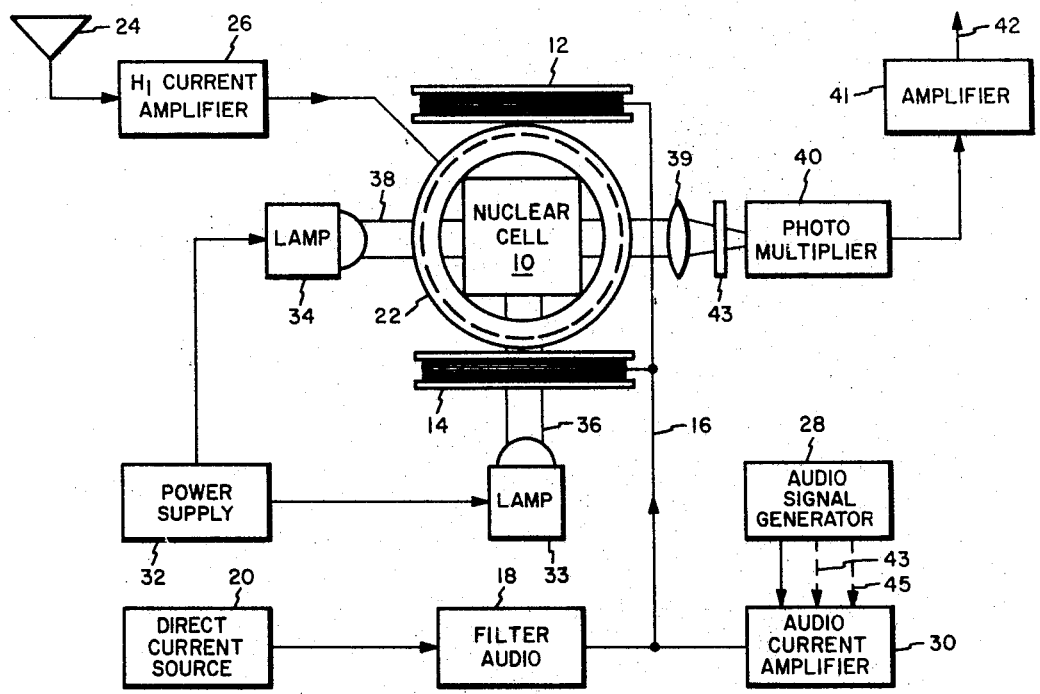
FIG. 2 is a circuit diagram partly in schematic form and partly in block form showing the spin resonance filter according to the invention.

Before describing the subject invention in detail, it might be helpful to briefly consider some fundamental aspects of nuclear magnetic resonance theory. The following explanation will be confined only to those concepts which are necessary for a proper understanding of this invention; if the reader is interested in a more extensive treatment on the subject of magnetic resonance, he is directed to the above cited patent to Bloch et al. or to standard texts on atomic theory.

In accordance with the principles of quantum mechanics it is known that certain nuclei possess a magnetic moment due to nuclear angular momentum or spin. The dual properties of magnetic moment and angular momentum behave as parallel vectors and are related to each other by the proportionality $\gamma$ commonly referred to as the magnetogyric ratio although sometimes it is referred to as the gyromagnetic ratio. In any event, the latter is given by $$2\pi\mu/Ih \quad (1)$$

where $\mu$ is the maximum measurable component of the magnetic moment, $I$ is the nuclear spin member and $h$ is Planck's constant. Examples of the magnetogyric ratio measured experimentally for two isotopes of mercury are as follows:

$^{199}$Hg 4768.97 rads/(gauss-sec.)
$^{201}$Hg 1760.41 rads/(gauss-sec.)

If an isolated nucleus having a magnetic moment is placed in a uniform steady magnetic field $H_0$ it might be expected to act like a true dipole and line up with the magnetic field much as a compass needle lines up with the earth's magnetic field. Strictly speaking, however, this never occurs because the nucleus has associated with it angular momentum which produces certain gyroscopic effects. Actually, the torque produced by the gyroscopic action of the nucleus together with the torque produced by the magnetic interaction between the nuclear magnetic moment and the magnetic field establishes an orientation of the nucleus which may be considered to be only nominally aligned with the external field. From quantum mechanics it is known that the angular momentum of a nucleus may take on series of discrete values given by $(2I+1)$ where each value corresponds to a preferred orientation of the nuclear spin vector in space. Corresponding to this quantization of angular momentum components, the nuclear magnetic moment also has $(2I+1)$ components in proportion. In other words, there will be a plurality of discrete ground state energy levels associated with the nuclear magnetic moment in the magnetic field $H_0$ with each separate energy level corresponding to a different preferred orientation of the nuclear magnet in the magnetic field. It can be shown that the energy separation between adjacent quantized energy levels in terms of the magnetic moment is equal $$\mu H_0/I$$

Thus, in the case where $I=\frac{1}{2}$, for example, two ground state levels will be observed having an energy separation $2\mu H_0$, and, roughly speaking, the two levels will correspond respectively to alignment of the nuclear magnet parallel and antiparallel to the $H_0$ field.

This quantization of nuclear energy levels in a magnetic field is closely analogous to the Zeeman splitting of electron energy levels in a magnetic field. Therefore, if in addition to the steady magnetic field $H_0$, the nucleus is subjected to electromagnetic radiation of a proper frequency, transitions will be induced between adjacent quantized energy levels by a process of absorption or stimulated emission of quanta of energy. The frequency of this radiation $\nu_0$ may be obtained from the Bohr frequency condition $$h\nu_0 = \mu H_0/I \quad (2)$$

or $$\nu_0 = \mu H_0/Ih \quad (3)$$

Since the absorption of energy giving rise to such transitions will be detected only for a characteristic frequency $\nu_0$ for each species of nucleus, the process is a resonance phenomenon and consequently is referred to as nuclear magnetic resonance (NMR).

In Zeeman effect transitions the emitted electromagnetic radiation is circularly polarized in the plane perpendicular to the steady magnetic field $H_0$. Conversely, in order to excite transitions in the magnetic resonance experiment it is necessary to supply radiation with a component of the magnetic vector circularly polarized in a plane perpendicular to the steady magnetic field.

Figure 1:
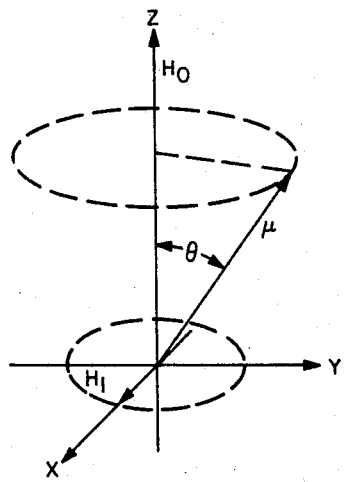
FIG. 1 is a vector schematic illustrating Larmor precession in a rectangular coordinate frame of a reference.

This requirement of circular polarization is just what one would expect from a classical treatment of the problem. If a magnetic dipole represented by the vector $\mu$ is placed in a magnetic field $H_0$, as illustrated, for example, in FIG. 1, it can be shown that the dipole will precess about the direction of the applied field at a rate given by the well known Larmor angular frequency $$\omega_0 = \gamma H_0 \quad (4)$$

where $\gamma$ represents the magnetogyric ratio of the dipole. Suppose now that an additional small magnetic field $H_1$ is applied at right angles to $H_0$ and perpendicular to the plane containing $\mu$ and $H_0$ as shown in FIG. 1. The dipole will experience a torque $(\mu \times H_1)$ tending to increase or decrease the angle $\theta$ between $\mu$ and $H_0$. If the direction of the $H_1$ field is made to rotate about $H_0$ in synchronism with the precession of the dipole, this torque will cause the angle $\theta$ to increase or decrease steadily. If, on the other hand, $H_1$ rotates with angular frequency substantially different from the Larmor precessional frequency, or in opposite sense, the torque $(\mu \times H_1)$ will vary in magnitude and direction according to the relative phases of the two motions, and will merely produce small perturbations of the precessional motion with no net effect. A resonance therefore occurs when the angular frequency $2\pi\nu_0$ of the rotating field $(H_1)$ is equal to the angular frequency of Larmor precession, or $$2\pi\nu_0 = \omega_0 = \gamma H_0 \quad (5)$$

Recalling that $$\gamma = 2\pi\mu/Ih \quad (6)$$

we get $$\nu_0 = \mu H_0/Ih \quad (7)$$

and it is seen that the classical resonance condition agrees exactly with that derived from the quantum theory. Moreover, it is clear from the classical condition, as it was from the quantum mechanical viewpoint, that a basic requirement for observation of the resonance is that the electromagnetic radiation be circularly polarized with the magnetic vector rotating in a plane perpendicular to the steady magnetic field. In most NMR experiments it is usually simpler to provide a linearly oscillating field instead of a rotating magnetic field. Fortunately, such linear polarization is quite adequate, since a linearly oscillating field may be regarded as the superposition of two contra-rotating fields. Resonance will be obtained therefore with the rotating field in phase with the Larmor precession while the field rotating in the direction opposite to Larmor precession will have little effect on resonance.

As mentioned above, the magnetic moment of a nucleus in a steady magnetic field $H_0$ quantizes into either of two Zeeman ground states (for a nucleus with spin $\frac{1}{2}$) having an energy separation $2\mu H_0$. Consider events now when an entire assembly or collection of such nuclei are placed in the magnetic field $H_0$. After a time $T_1$, known as the relaxation time, the collection will reach thermal equilibrium at which point slightly more than half of the nuclei will have lined up in a direction parallel to the direction of $H_0$, corresponding to the lower energy ground state, and the remaining portion will have lined up in a direction antiparallel to the magnetic field, corresponding to the upper energy ground state. This process of creating a small, but finite, excess of population in the lower energy Zeeman ground state is called polarizing or orienting the spin system and the resulting disparity in population, expressed in the form of a ratio, may be calculated by using the Boltzman distribution $$\exp(2\mu H_0)/kT_s \quad (8)$$

where $k$ is Boltzman's constant and $T_s$ the equilibrium temperature. For example, in a collection in thermal equilibrium at room temperature comprising, say 2,000,000 protons in water in a field of 20,000 gauss, 1,000,007 may assume the parallel orientation while the remainder will assume an orientation in the antiparallel direction. One consequence of this unequal distribution of spins among the various Zeeman ground states will be a resultant macroscopic magnetic moment per unit volume in the direction of the applied field $H_0$.

Suppose now, that the polarized spin ensemble is subjected to an alternating magnetic field $H_1$, perpendicular to the $H_0$ field direction, and having substantially the frequency of Larmor precession. Since there are more atoms in the lower energy ground state, energy will be absorbed from the alternating field causing the lower energy atoms to make transitions to the higher energy level in a manner tending to equalize the number of atoms in each state. During this absorption process, however, the mechanism of relaxation causes sufficient numbers of atoms in the higher energy state to make incoherent transitions to the lower enregy state in an effort to restore thermal equilibrium. Thus, the net magnetization of the spin system corresponding to a finite population difference between ground state energy levels will be preserved and the absorption of energy from the $H_1$ source will be continuous. At a point where the applied radiation from the $H_1$ source is precisely at the Larmor frequency the amount of energy absorbed by the precessing nuclei will reach a maximum and the spin system may be said to be undergoing nuclear magnetic resonance.

In terms of our classical picture, then, the net macroscopic magnetization of the spin ensemble resulting from the latter's polarization in the presence of the $H_0$ magnetic field may again be represented by the vector $\mu$ precessing about the $H_0$ direction as viewed in FIG. 1. As the frequency of the alternating field $H_1$ approaches the Larmor value, the vector $\mu$ tilts outward from the Z axis and for relatively small values of $H_1$ its magnetization component in the X–Y plane approaches a maximum. It is convenient therefore to monitor nuclear magnetic resonance by detecting and measuring the transverse component of net magnetization precessing in the X–Y plane.

In view of the foregoing it is now believed that the reader is in a position to appreciate the detailed features of the preferred forms of the subject invention. Thus, turning to FIG. 2 there is schematically shown a nuclear sample cell 10 centrally positioned between two similar coaxially aligned magnetic field producing coils 12 and 14. In order to subject the sample volume to as uniform a magnetic field as is possible the two coils are arranged in a standard Hemholtz configuration, that is, they are separated along their common axis by a distance equal to the radius of each coil. When energized by the D.C. source 20 through audio rejection filter 18 and connection 16, the two coils 12 and 14 envelope cell 10 in a substantially homogeneous steady magnetic field $H_0$. A second pair of Hemholtz coils 22 having its common axis perpendicular to the common axis of coils 12 and 14 and normal to the plane of the paper as viewed in FIG. 2 is positioned about sample cell 10 so as to subject the latter to a second magnetic field $H_1$ perpendicular to the original $H_0$ field. Since the purpose of the $H_1$ field is to supply resonant electromagnetic radiation to a collection of nuclear spins in the sample cell, the $H_1$ coils 22 are adapted to be energized by a suitable alternating current source represented by way of example in FIG. 2 by antenna means 24 and amplifier 26. It will be appreciated therefore that while the $H_0$ field is a static one, the $H_1$ field is a varying one alternating through and around the sample cell in accordance with the instantaneous character of the A.C. input signal made available at antenna 24. Furthermore, in terms of their relative field strengths, $H_0 > H_1$.

Figure 3:
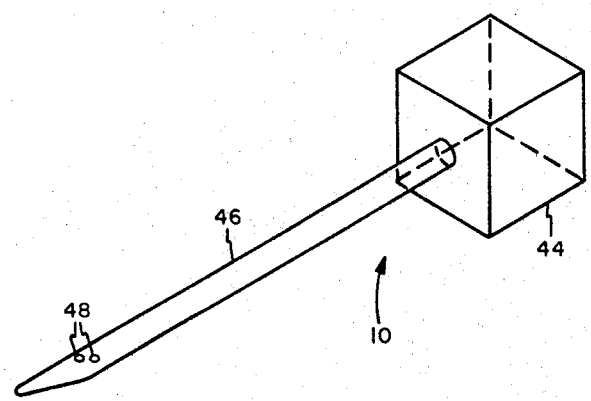
FIG. 3 is a schematic perspective of a nuclear sample cell.

As shown in more detail in FIG. 3 the sample cell 10 for containing the nuclear spin ensemble comprises a hollow head portion 44 integrally communicating with a hollow tail or "queusot" portion 46. The entire cell is fabricated from fused quartz to permit "optically pumped" radiation at a wavelength of 2537 A. to pass freely through the walls of the cell. Condensed on the interior wall of the queusot 46 as indicated, for example, by reference character 48 is a droplet or two mercury, preferably of the isotope $^{199}Hg$ although the isotope $^{201}Hg$ would suffice as well. The mercury is pumped into the cell using high vacuum techniques and the latter then sealed. An ice bath or suitable cooling medium (not shown) is then placed around the queusot to maintain same at 0° C. at which temperature a sufficient quantity of mercury atoms will boil off to produce a mercury vapor in the head portion or main body of the cell under a pressure on the order of $10^{-6}$ mm. of Hg. This corresponds to a nuclear density on the order of $10^{12}$ atoms/cm. which has been found experimentally to provide optimum "optical pumping" enhancement of the sample nuclear specie, namely $^{199}Hg$.

The term "optical pumping" as applied to the present invention refers to the passage of an intense beam of circularly polarized light through the sample cell so as to obtain a polarization of the spin collection with an accompanying net magnetic moment. The dynamic behavior of this net magnetization may then be observed by passing an additional beam of light through the sample perpendicular to the "pumping" beam.

In conventional NMR experiments, a net nuclear magnetization is achieved by utilizing relatively high-strength magnetic fields to produce a thermal equilibrium difference in population among the nuclear Zeeman ground state levels. To illustrate, a typical high-field NMR experiment involving $^{199}Hg$ vapor requires a magnetic field on the order of a few kilogauss to produce a Larmor resonance on the order of tens of megacycles. In contrast, when optical pumping and monitoring is employed on the same sample, much weaker magnetic fields may be used, say, on the order of 25 gauss to produce resonance at 18.9 kHz. which, of course, is well within the audio frequency range. In addition, by "optically pumping" the sample with circularly polarized light along the direction of the magnetic field a much greater difference between the relative populations of the levels may be produced. For example, for a given number of atoms in an external field as low as one gauss the difference in population can can be increased by a factor of $10^9$. This means that polarizations (net magnetizations) of almost the same magnitude as those developed with high-field NMR methods can be obtained using far fewer atoms of sample nuclei in much weaker magnetic fields. As a result, the signal-to-noise ratio in an optically pumped and monitored NMR device is substantially independent of magnetic field and frequency whereas in conventional methods the signal-to-noise ratio available at low fields, and hence low frequencies, is poor. Thus, while low frequency applications cannot be satisfactorily handled by conventional polarization methods, the "optically pumped" NMR technique is admirably suited for applications at such frequencies.

In standard NMR techniques the precessing nuclear magnetization induces an alternating voltage in a coil tightly coupled to the sample volume, while with optical monitoring the precessing nuclear magnetization modulates the intensity of a light beam passing through the sample volume perpendicularly to the axis of precession. Thus, excellent isolation is provided between the audio frequency driving signal and the readout element which is sensitive to light. This insures little or no coupling between the input and output circuits of the optically monitored NMR device and is another reason for the excellent signal-to-noise ratios achieved by the apparatus according to the present invention.

Turning again to FIG. 2, power supply 32 is shown energizing a pair of lamps 33 and 34. Lamp 33 directs a high intensity "pumping" beam 36 comprising circularly polarized light at a wavelength of 2537 A. through sample cell 10 in the direction of the $H_0$ field; that is parallel to the common axis of coils 12 and 14. Lamp 34, on the other hand, directs a similar beam 38 of circularly polarized 2537 A. light through cell 10 in an orthogonal direction relative to the "pumping" beam 36 as indicated. Beam 38 comprises the readout or monitoring beam of the apparatus.

Figure 4:
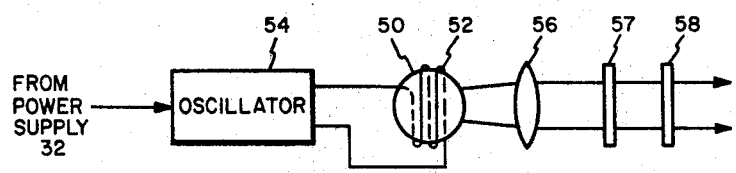
FIG. 4 is a schematic of an ultraviolet light source.

Lamps 33 and 34 are structurally identical to one another and as schematically shown in FIG. 4 each comprises for the most part a hollow bulb-like vessel 50 enclosed within a coil 52. The vessel 50 as in the case of the sample cell 10 is fabricated from fused quartz and has a few droplets of mercury added under a high vacuum. Each vessel however, preferably contains the isotope $^{204}$Hg rather than the $^{199}$Hg isotope used in cell 10 because the emission spectrum associated with the former includes primarily a single spectral line at 2537 A. The emission spectrum of $^{199}$Hg includes several primary components. When the vessel is sealed and later heated, the mercury ($^{204}$Hg) vaporizes and the vessel fills with mercury under a pressure dictated by the reservoir temperature of the vessel.

Oscillator circuit 54 is designed to apply an alternating current having a frequency on the order of 100 mHz. to coil 52. The resulting high frequency electric field developed by the coil excites the mercury atoms within vessel 50 raising them to a higher energy level. To aid in this process, the vessels 50 preferably includes a small quantity of buffer gas, typically argon. As the excited atoms decay back to the ground state radiation is emitted including primarily the spectral line at 2537 A. The emitted radiation is then collected by a quartz lens 56 and passed through a circular polarizer comprising a linear polarizer 57 and a quarter-wave plate 58. The outputs of lamps 33 and 34 thus comprise respectively a beam of circularly polarized light radiation having a high intensity spectral component at 2537 A. And, although the two separate lamps 33 and 34 as shown in FIG. 2 are preferred, it will be appreciated that a single lamp in combination with a beam splitter and mirror may be used instead to provide the two beams 36 and 38, or that the two beams may be combined into a single beam at some intermediate angle, preferably 45° to $H_0$.

Figure 5:
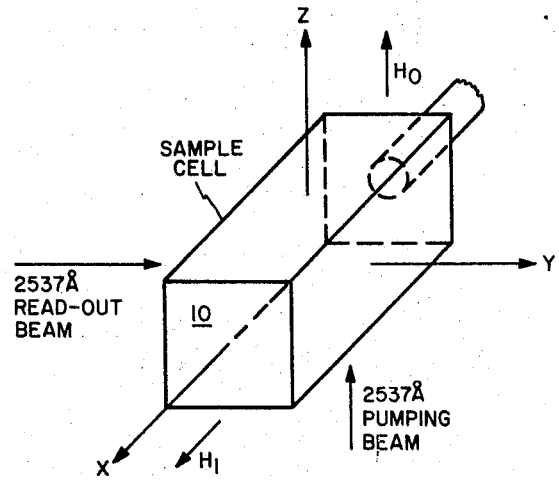
FIG. 5 is a perspective relating the sample cell to a set of rectangular coordinate reference axes.

The geometrical relationship among "pumping" beam 36, readout beam 38, and the directions of the external magnetic fields $H_0$ and $H_1$ are conveniently summarized in FIG. 5 which schematically depicts the head portion of sample cell 10 referenced with respect to a rectangular coordinate system comprising X, Y and Z axes. The $H_0$ field and the "pumping" beam are both aligned relative to the cell along the latter's Z axis while the $H_1$ field is directed along the X axis. The readout beam although shown to be aligned along the cell's Y axis may, in fact, lie along any convenient direction in the X-Y plane.

Since the intense 2537 A. radiation emitted by $^{204}$Hg as it returns to the ground state is substantially at the frequency of photon energy required to raise $^{199}$Hg from the Zeeman ground state to the excited state, the "pumping" beam interacts strongly with the atoms in cell 10 through the mechanism known as optical resonance scattering. What actually happens is that the $^{204}$Hg radiation being circularly polarized causes atoms from only the $^{199}$Hg upper energy ground state to make transitions to the excited state. These excited atoms, however, can return with equal probability to both the upper and lower energy $^{199}$Hg Zeeman ground state levels. Hence, there results an overpopulation in the lower energy ground state of $^{199}$Hg producing a polarization of the ensemble of atoms in cell 10 with an accompanying net magnetization parallel to the direction of the $H_0$ field. On the other hand, reversal of the sense of the $^{204}$Hg circular polarization will cause depletion in the low energy ground state and over-population in the upper energy ground state in which case the orientation of the ensemble of atoms will be characterized by a net magnetization anti-parallel to the direction of the $H_0$ field.

In a classical sense, the effect of the circularly polarized beam of resonant radiation is to transfer angular momentum to the collection of spins in the cell. The resulting exchange of angular momentum polarizes or orients the spin system producing a net microscopic magnetization vector parallel or anti-parallel to the $H_0$ magnetic field direction. A coherent magnetic field, supplied by the $H_1$ coils 22, whose frequency is given by Equation 5 will cause this net magnetization vector to tilt away from the direction of the magnetic field $H_0$ and to precess about this direction at or near the Larmor frequency thus establishing the condition of nuclear magnetic resonance.

As pointed out above the orientation of the spin system produced by the intense pumping action of beam 36 corresponds to an overpopulation in one of the Zeeman ground state sublevels. Thus, from a quantum mechanical viewpoint, nuclear magnetic resonance is achieved when the coherent $H_1$ field has a frequency near to that associated with the energy separation of the Zeeman sublevels in the ground state as discussed previously in connection with Equation 2 and therefore causes transitions to occur between the differently populated sublevels.

It will be recalled that the magnetization vector is tilted away from the direction of the $H_0$ field or Z direction (FIG. 5) during its precessional motion and therefore has a transverse component in the X-Y plane which rotates at the precessional frequency. Owing further to the fact that optical resonance exists between the circularly polarized $^{204}$Hg 2537 A. readout beam 38 and the $^{199}$Hg atoms in cell 10 and noting that the readout beam is aligned in the X-Y plane, the oriented spin ensemble will absorb angular momentum from the readout beam in the same manner the spin ensemble absorbs angular momentum from pumping beam 36. However, this absorption of energy from the readout beam rather than being continuous varies sinusoidally, reaching a maximum each time the precessing magnetization vector component in the X-Y plane is parallel to and is pointing into the direction of the readout beam. The net effect is an intensity or amplitude modulation of the readout beam at the Larmor precessional frequency.

An output circuit for deriving an electrical analog corresponding to the frequency of amplitude modulation of the readout beam is provided as shown in FIG. 2 and includes a quartz lens 39 and a 2537 A. passband filter 43 for focusing the readout beam onto the photocathode of a photomultiplier 40. The latter detects the modulations impressed upon beam 38 and produces a useful A.C. voltage output which in the case of the usual nuclear magnetic resonance experiment will have a frequency content at or near the Larmor frequency. The output of the photomultiplier is then amplified in matching amplifier 41 to produce a filter output signal on conductor 42 as will be made more evident below.

In order to adapt the NMR apparatus thus far described for filtering applications in accordance with the principles of the invention, sideband resonances in positions satellite to the usual Larmor resonance are generated. These satellite or sideband resonances are produced by modulating the steady magnetic field $H_0$ with a sinusoidal waveform having an amplitude $H_0'$ and a frequency $\omega_0'$. The expression for the total magnetic field $H_z$ applied along the Z axis of FIG. 5 may then be given by $$H_0 + H_0' \sin \omega_0' t \qquad (8)$$

and the resulting sideband frequencies may be predicted by the Bessel function components of $\gamma H_0$, namely $$\gamma H_0 \pm \omega_0', \ \gamma H_0 \pm 2\omega_0', \ \gamma H_0 \pm 3\omega_0' \ \ldots \ \gamma H_0 \pm n\omega_0' \qquad (9)$$

Modulation of the steady magnetic field $H_0$ is accomplished as shown in FIG. 2 by providing an audio frequency oscillator 28, the output of which is matched into coils 12 and 14 via an audio current amplifier 30 and common connection 16. The audio rejection filter 18 prevents the $\omega_0'$ signal from reflecting a varying impedance into the D.C. source 20. Alternatively, a separate pair of Hemholtz coils may be positioned on either side of cell 10 between coils 12 and 14 from supplying the modulation frequency. In such a situation, the modulation coils will be directly coupled to amplifier 30. However, the rejection filter 18 must still be retained because of mutual induction between the two pairs of coils.

In the spin resonance filter just described, the signal to be filtered serves as the input to the coils used to generate the $H_1$ magnetic field and a stable discrete modulation frequency ($\omega_0'$) is used to generate the sidebands. The index of modulation is chosen to be large so that many sidebands are created having magnitudes comparable to the unmodulated magnetic resonance. If the $H_1$ input, or driving signal, includes a frequency component which is coincidental with any one of the sideband frequencies, all of the sidebands will be excited and all will be observed in the readout circuit. This is true because modulation of the $H_0$ magnetic field results in a rather complex precessional motion as respects the spin system's net magnetization vector. That is, motion of the vector is now composed of a plurality of spin-precessional frequency components each of which is related to a different corresponding sideband frequency. Due to inherent coherency in the generation of the sideband structure each of the spin-precessional frequency components maintains a constant phase-locked relation to each and every other frequency component. Accordingly, when any one of the spin-precessional frequency components has an X-Y component of magnetization and is synchronzied by a coherent $H_1$ drive frequency all of the frequency components are spin synchronized and all appear as A.C. modulations in the readout beam.

Figure 6:
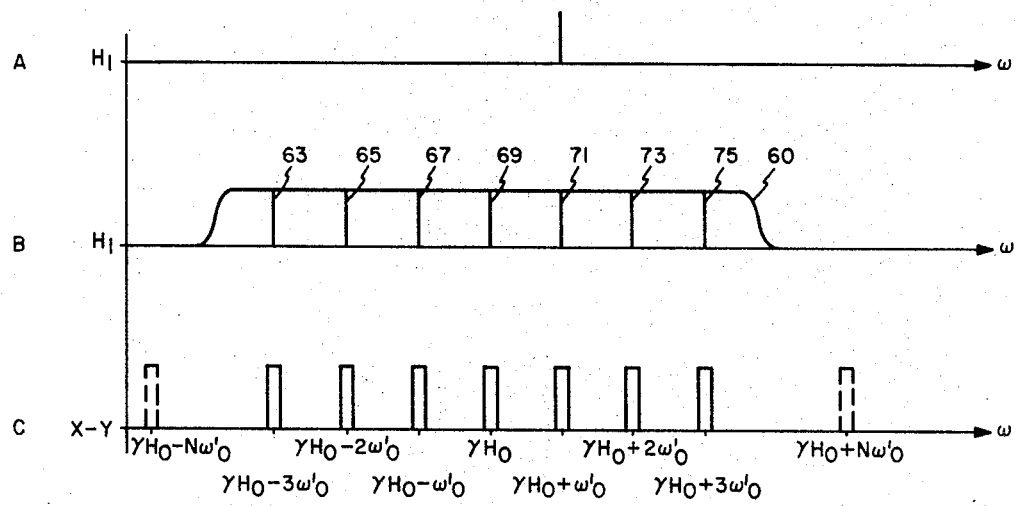
FIG. 6 is a set of graphs explaining the operation of the spin rseonance filter of FIG. 2 when strong modulation is used.

Thus, as depicted in FIG. 6, an $H_1$ discrete frequency input signal (graph A) coincident with one of the sideband frequencies, say $\gamma H_0 + \omega_0'$, for example, excites all of sidebands including the Larmor frequency and they all appear as modulations in the readout beam.

Suppose now that a wide band spectral signal represented by solid line curve 60 (graph B) is applied to input terminal 24, FIG. 1, for driving the $H_1$ coils 22. Since the input signal obviously includes frequencies coincidental with at least one if not all of the sideband frequencies, all of the spin-precessional frequency components will be synchronized and only the spectral frequencies corresponding to the Bessel function components of $\gamma H_0$ as indicated by lines 63-75 will appear in the NMR output circuit. Inasmuch as the remainder of input spectrum 60 has been effectively rejected by the spin resonance filter, the latter may be said to have a passband shape as indicated by graph C of FIG. 6. Such passbands are commonly referred to as "comb-filters" for obvious reasons. It will be appreciated further that the spacing between the "teeth" in the comb-filter passband is determined by the choice of frequency employed to modulate the static field $H_0$ and as seen in FIG. 1, this frequency is supplied by audio oscillator 28. Hence, the spacing between the comb-filter pass or rejection bands may be varied electronically over a relatively wide range by simply varying the frequency of the oscillator's output.

As is well known, absorption at resonance occurs over a range of frequencies giving rise to a broadened line rather than a single sharp frequency as implied by Equations 2 and 5. One important cause of such broadening can be attributed to gradients in the static magnetic field $H_0$ over the dimensions of the sample and is referred to as inhomogeneous broadening. The effects of inhomogeneous broadening extend also to the resonant sideband frequencies appearing as modulations in the readout beam and together with the relaxation effects alluded to above contribute to the finite width of the "teeth" as observed in the "comb" of graph C (FIG. 6). Nevertheless, by using methods known in the art it is possible to control the homogeneity of the $H_0$ field sufficient enough so that "combs" having individual "tooth" widths as narrow as 1 Hz. are realizable. This measured width refers to the full width at half-amplitude of the Lorentzian line shape function corresponding to the output resonances and for all intents and purposes may be considered to comprise the bandpass width of each "tooth." By the same token, relatively wide "teeth" may be synthesized by merely reducing the effective homogeneity of the $H_0$ field accordingly. This may be done, for example by providing field gradient coils and/or introducing a suitable buffer gas into the sample cell 10.

Summarizing, in the spin resonance filter of FIG. 2 the $H_0$ field is modulated by a single stable frequency $\omega_0'$ to produce a "comb-like" passband shape and the index of modulation is deliberately chosen to be large as to create many significant sidebands corresponding to the passband's "teeth."

In an alternate preferred form of the invention the apparatus of FIG. 2 is modified by simultaneously modulating the $H_0$ field with a selectable combination or set of different discrete frequencies $\{\omega_0'\}$ and deliverately choosing the index of modulation to be relatively low. In consequence, only the Larmor resonance and the respective first order sidebands are of significance, the higher order sidebands being of relatively low amplitude.

By appropriate selection of the various frequencies comprising the set $\{\omega_0'\}$, arbitrary pass-spectra may be synthesized of practically any desired shape.

Figure 7:
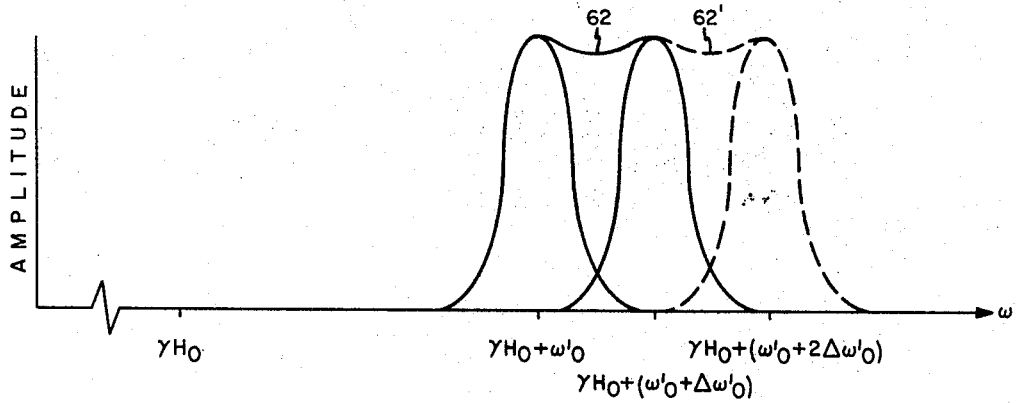
FIG. 7 is a graph explaining the operation of the spin resonance filter of FIG. 2 when weak modulation is used.

To illustrate this, consider the simple case depicted in FIG. 7 where a pair of independently excited sidebands are shown resulting from the weak modulation of the $H_0$ field by a set of two closely spaced frequencies $\omega_0'$ and $\omega_0' + \Delta\omega_0'$. Although only the upper sideband pair is indicated there exists a corresponding lower sideband pair as well. Therefore, whenever the frequencies $\gamma H_0$, $\gamma H_0 \pm \omega_0'$ and/or $\gamma H_0 \pm (\omega_0' + \Delta\omega_0')$ appear in the $H_1$ input or driving signal, these same frequencies will appear in the output circuit. All others will be rejected. In effect then, a pair of mirror image passbands have been synthesized each having a shape indicated by the solid line curve 62.

Suppose now it is desired to increase the effective bandwidth of passband 62. A third frequency component $\omega_0' + 2\Delta\omega_0'$ is merely added to the set of frequencies modulating the $H_0$ field to generate still another sideband at $\gamma H_0 + (\omega_0' + 2\Delta\omega_0')$. As as result, passband 62 now assumes the enlarged shape indicated by the addition of the broken line curve 62'.

Thus, it is seen that by modulatingthe $H_0$ field with a suitably chosen combination of closely spaced frequencies and employing a low index of modulation, practically any desired passband shape may be created. In such situations, the behavior of the spin resonance apparatus of FIG. 2 is similar to that of a classical optimum filter network since it is capable of creating arbitrary pass-spectrums by simply electronically controlling the input frequencies simultaneously applied to current amplifier 30. As indicated schematically by the broken lines 43 and 45, these modulating frequencies may be generated locally from a convenient source such as audio signal generator 28.

In connection with the spin resonance filter of FIG. 2 utilizing weak modulations of the $H_0$ field, it is to be noted that the input signal being filtered may alternatively be applied to current amplifier 30 for modulating the $H_0$ field and the locally generated readout signal applied to the $H_1$ coils through amplifier 26 without affecting the operation of the apparatus. This would be true, however, only when the signal being filtered is small enough in amplitude so that modulation of the $H_0$ field thereby produces only first order sideband resonances. If, on the other hand, the signal being filtered has a large enough amplitude and is applied to current amplifier 30 many orders of sidebands will be generated and the spin resonance filter of FIG. 2 will function as described above initially, that is, in response to a strong modulation of the $H_0$ field.

Figure 9:
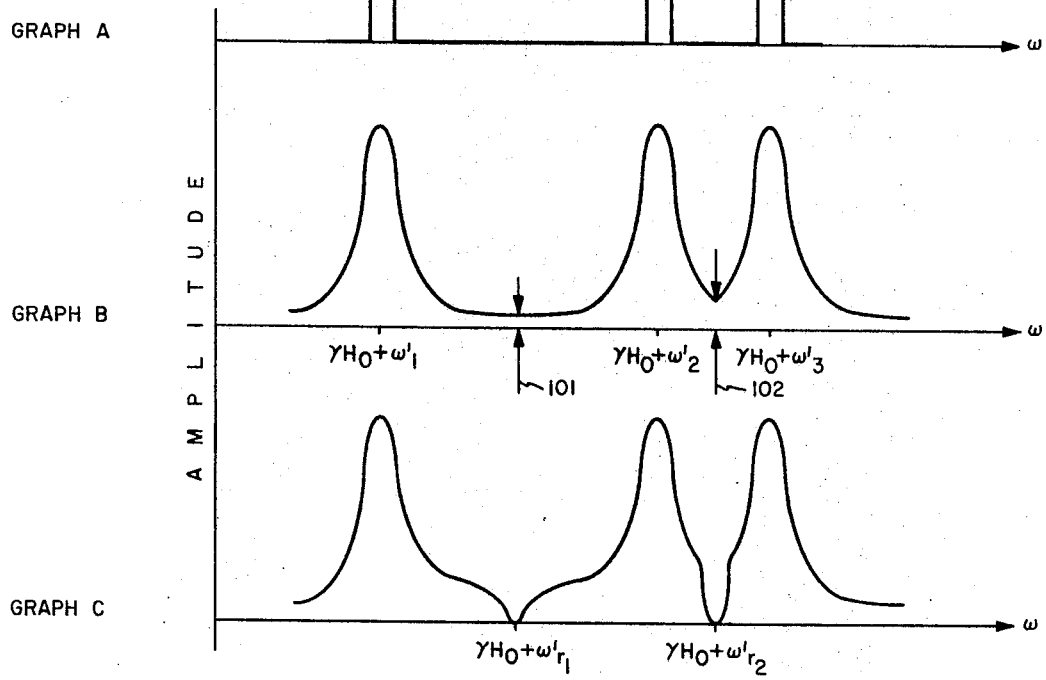
FIG. 9 is a graph explaining the operation of the spin resonance filter apparatus of FIG. 8.

It will be apparent that by taking advantage of the independent nature of the resonant sideband frequencies produced in the case of a weakly modulated spin resonance filter, the latter may be used to construct a "comb-like" passband having irregularly spaced "teeth" such as that shown, for example, in FIG. 9, graph A. Thus, in the case where the signal being filtered is applied directly to current amplifier 30 for modulation of the $H_0$ field, all that is necessary is to feed a locally generated set of readout frequencies $\{\gamma H_0 + \omega_n'\}$ into the $H_1$ coils to excite resonant sidebands at $\gamma H_0 + \omega_1'$, $\gamma H_0 + \omega_2'$, and $\gamma H_0 + \omega_3'$ as indicated in FIG. 9, graph B. Or, if desired, the signal being filtered may be alternatively applied to the $H_1$ coils in which situation a set of locally generated frequencies $\{\omega_n'\}$ must then be employed to modulate the $H_0$ field to produce the same results, namely, the generation of the sideband resonance indicated in FIG. 9, graph B.

Whichever method is chosen, it will be observed that the notches between the "teeth" in the filtered output signal do not exhibit perfect rejection characteristics. This is due to the Lorentzian nature of the resonant frequencies appearing in the output signal. The presence of strong signal components in the signal being filtered at frequencies represented by arrows 101 and 102, for example, will thus tend to be observed in the filtered output waveform. In order to increase the "notching" or "intertooth" rejection characteristics of the passband a pair of spin resonance filters are arranged as diagrammed in FIG. 8. Each filter is of the "weak modulation" type already proposed in conection with FIGS. 2 and 7, however, the output of one is negatively fed back to an input common to both for producing notches where desired. Moreover, in the FIG. 8 embodiment shown, the signal being filtered is applied directly to amplifier 30 in each instance for modulating the $H_0$ field and the local readout signal is applied respectively to the $H_1$ coil input of each filter.

Let $\{\omega_n'\}$ represent the frequencies to be passed and $\{\omega_r'\}$ represent the desired location of the improved notches in the frequency domain. The spectral signal to be filtered including these frequency components is applied to a common input summing junction 71, the outputs of which are applied along suitable connections 72 and 74 to weakly modulate the $H_0$ fields of filters 76 and 78. Filter 76 has its $H_1$ coils excited by a set of locally generated readout frequencies $\{\gamma H_0 + \omega_n'\}$ made available along conductor 80 while filter 78 also has its $H_1$ coils energized by a set of locally generated readout frequencies $\{\gamma H_0 + \omega_r'\}$ impressed on line 82. In accordance with the "weak modulation" opertaion of the spin filter as discussed previously, independent pairs of first order resonant sidebands are excited in filter 78 with the result that frequencies corresponding to $\{\gamma H_0 \pm \omega_r'\}$ appear in the latter's output circuit. Since the upper and lower sideband frequencies in this set have a relatively wide separation given by $2(\omega_r')$ they may be easily separated in pass-band filter 84 which does in fact select the upper sidebands and feeds them to mixer 86 as indicated. The mixer is fed by a locally generated frequency $\gamma H_0$ along conductor 88 and accordingly heterodynes the upper sidebands down to $\{\omega_r'\}$ This signal is then inverted in amplifier 90 and negatively fed back to summing junction 71 via connection 92. The gain of amplifier 90 is carefully adjusted so that the amplified feedback signal effectively washes out or cancels the $(\omega_r')$ components from the input signal until the output signal appearing on conductor 72 of junction 71 essentially comprises only discrete frequency components in the set $\{\omega_n'\}$. Recalling that conductor 72 carries the input signal being filtered and that this signal is being applied to modulate the $H_0$ field of filter 76; the latter's output signal in turn, contains sidebands corresponding to the set $\{\gamma H_0 \pm \omega_n'\}$. From this signal, band filter 94 selects the upper sideband frequencies and applies them to mixer 35 where they are heterodyned with the locally generated frequency $\gamma H_0$ made available on conductor 88'. The output of mixer 96 thus comprises only discrete frequency components of $\omega_n'$, the $\omega_r'$ components having been rejected via the feedback action around filter 78 and summing junction 71.

The effect of the negative feedback around filter 78 and summing junction 71 is to provide almost perfect notches centered at the frequencies $\gamma H_0 + \omega_{r1}'$ and $\gamma H_0 + \omega_{r2}'$ as indictaed in graph C of FIG. 9. The circuit of FIG. 8 therefore provides a "comb-like" filter having excellent pass and rejection characteristics and irregularly spaced "teeth." In addition, teeth spacing and notch locations may be varied in an obvious manner by electronically selecting the particular combinations of readout frequencies applied to the $H_1$ coils of each spin resonance filter 76 and 78.

Figure 8:
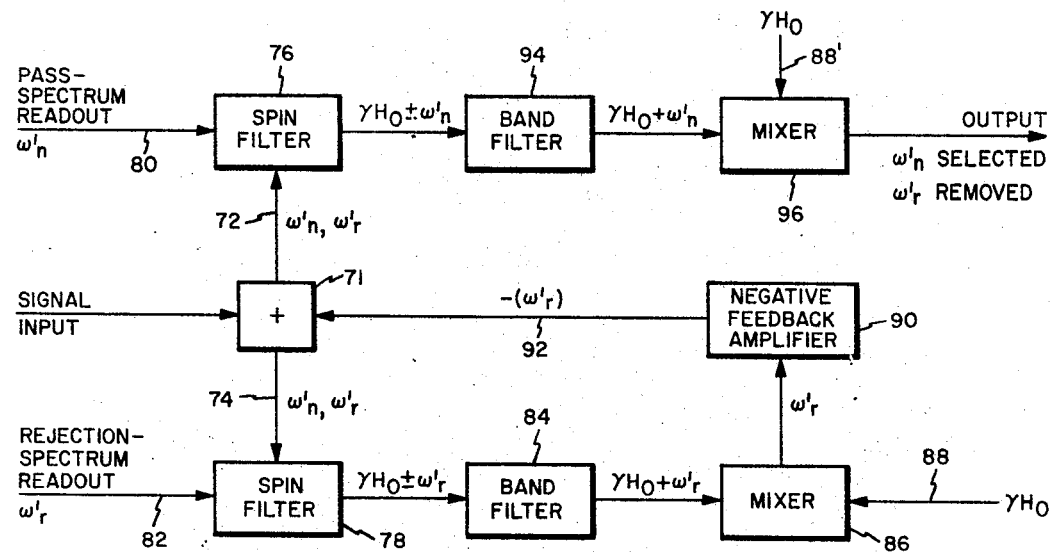
FIG. 8 is a circuit diagram in block form showing an alternate preferred form of the spin resonance filter of FIG. 2.

In certain respects it may be desirable to operate the FIG. 8 embodiment in an alternative manner; that is, by applying the signal being filtered directly to the $H_1$ coils of each filter respectively (in contrast to modulating the $H_0$ field of each filter with this signal). When this is done the locally generated readout frequencies become the $H_0$ modulation frequencies corresponding to each spin filter and are given respectively by $\{\gamma H_0 - \omega_n'\}$ and $\{\gamma H_0 - \omega_r'\}$. Since weak modulation is employed only the Larmor frequency and the first order sidebands appear in the output of filter 78, namely $\{\omega_r'\}$, $\{\gamma H_0\}$, and $\{2\gamma H_0 - \omega_r'\}$. The $\{\omega_r'\}$ frequency components may thus be selected in passband filter 84 and directly fed back to summing junction 71 through amplifier 90 thereby dispensing with mixer 86. Likewise, the $\{\omega_n'\}$ frequency components appearing in the output of spin filter 76 may be selected directly via band-pass filter 94 thereby obviating mixer 92.

In view of the foregoing, it will be appreciated that the present invention relates to adjustable filter networks having a degree of flexibility heretofore lacking in the prior art. By utilizing the effects of magnetic resonance, band-pass shaping and positioning may be electronically varied through an almost unlimited range of frequencies. And, although the preferred forms of the invention were particularly described in connection with the magnetic resonance of nuclei a similar phenomenon, known as electronic magnetic resonance may be utilized as well, the latter occurring in substances having unpaired electrons. When electronic magnetic resonance (EMR) is employed, the same principles apply as in nuclear magnetic resonance, with the exception that the magnetogyric ratio of the atom is related to that of the electron, hence its Larmor frequency is much larger than that corresponding to the nuclei in the same magnetic field. Thus, the present invention may utilize either nuclear magnetic resonance, or electronic magnetic resonance, it being understood that the term "magnetic resonance" is generic and includes both. Nor is it absolutely essential that the magnetic resonant sample comprise atoms of $^{199}Hg$ in vapor form as was disclosed herein by way of illustrating the preferred forms of the invention. Any suitable atomic or molecular specie, whether it be in solid, liquid or vaporous form will satisfy the principles of the invention so long as the sample substance incorporates "spin" properties and possesses a magnetic moment.

Since many additional modifications within the spirit of the invention will occur to those skilled in the art, it is desired that the present invention be limited only by the true scope of the appended claims.

What is claimed is:

1. Apparatus for synthesizing a filter network comprising:
   a first magnetic resonance cell (76) containing an ensemble of magnetic moments polarized within a steady magnetic field, and including a first input means (80) for applying a varying magnetic field perpendicular to said steady field, a second input means (72) for weakly modulating said steady magnetic field, and an output (42, FIG. 2) for producing a signal having frequency components related to sidebands of the Larmor frequency of precession of said ensemble, a second magnetic resonance cell (78) identical to said first cell, common junction means (71) for applying a spectral frequency signal simultaneously to each of said second input means associated with said first and second cells respectively, said second cell's first input means (82) having a plurality of independent discrete frequency components applied thereto for producing corresponding Larmor frequency sidebands in said second cell's output, means for heterodyning said frequency sidebands (86) to produce signals corresponding to said independent discrete frequency components; negative feedback means (90) for applying said discrete frequency component signals to the second input (72) of said first cell whereby said negative feedback is effective to cancel the like frequency components appearing in said spectral frequency signal when the latter is applied to weakly modulate the steady magnetic field of said first cell, and means for applying a different plurality of independent discrete frequency components to said first cell's first input means (80) whereby the output of said first cell comprises Larmor frequency sidebands related only to said different plurality of frequency components despite the present of said first mentioned plurality of frequency components in said spectral frequency signal applied to said common junction means.

2. The apparatus of claim 1 further comprising:

means (96) responsive to the output of said first cell for heterodyning said Larmor frequency sidebands to produce a filtered output signal corresponding to said spectral signal, said output signal having frequency components related only to said different plurality of frequency components applied to the first input means of said first cell.

References Cited

UNITED STATES PATENTS

| | | | |
|---|---|---|---|
| 3,348,137 | 10/1967 | Nelson | 324—.5 |
| 3,147,427 | 9/1964 | Varian | 324—.5 |
| 3,150,313 | 9/1964 | Dehmelt | 324—.5 |
| 3,378,760 | 4/1968 | Jackson | 324—.5 |

RUDOLPH V. ROLINEC, Primary Examiner

M. J. LYNCH, Assistant Examiner

U.S. Cl. X.R.

332—51; 333—70